Figure 1:
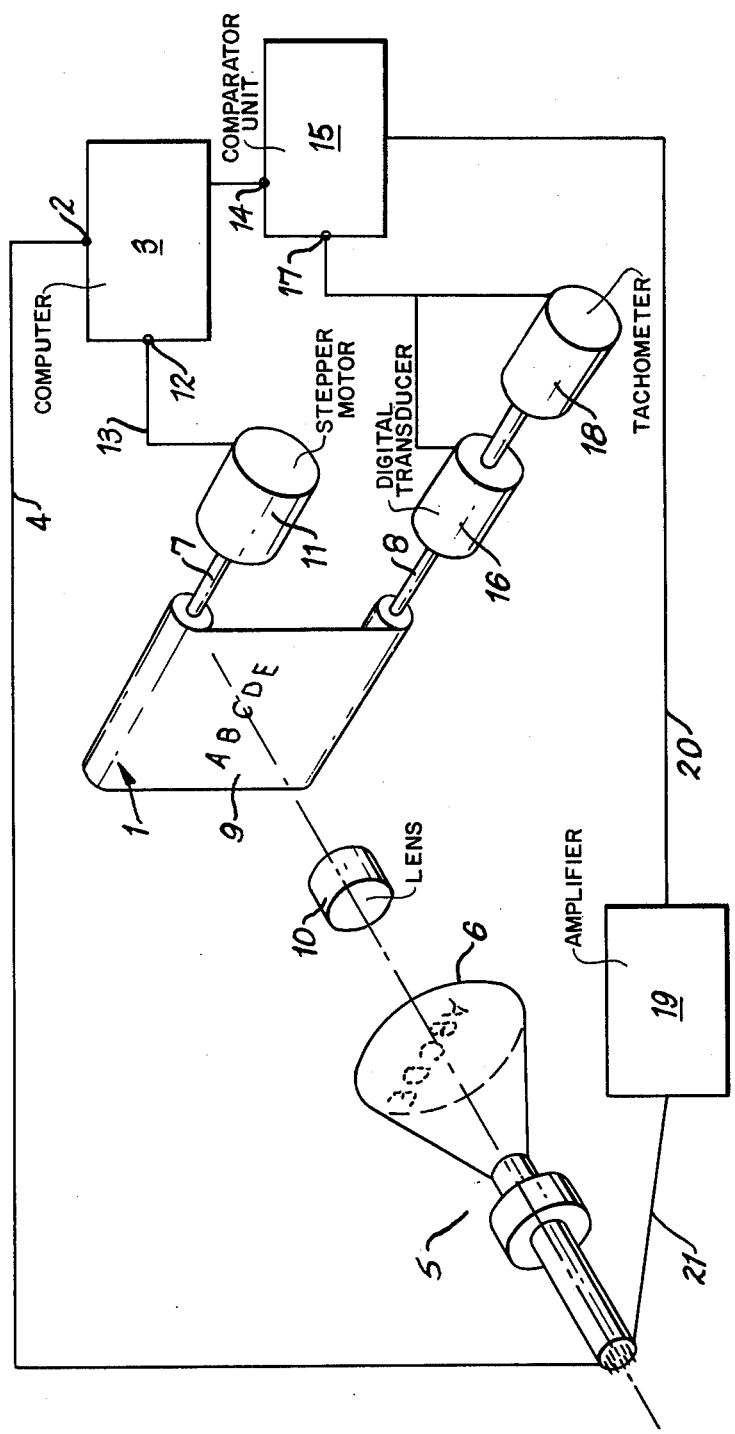

United States Patent [19]

Talbot

[11] 4,039,746

[45] Aug. 2, 1977

[54] RECORD MEMBER ADVANCE SYSTEM

[75] Inventor: George Clive Ashmead Talbot, London, England

[73] Assignee: Linotype-Paul Limited, London, England

[21] Appl. No.: 586,798

[22] Filed: June 13, 1975

[51] Int. Cl.² .................. G11B 15/54; H04L 15/34
[52] U.S. Cl. .................................... 178/15; 360/73; 358/132
[58] Field of Search .................. 178/15, 30, 6.6 P; 340/324 A, 324 AD; 346/110 R; 354/10, 12; 360/73

[56] References Cited
U.S. PATENT DOCUMENTS 3,482,255  12/1969  Baker, Jr. et al. .................. 178/15
3,663,763   5/1972  Trost ............................... 178/6.6 P Primary Examiner—Thomas A. Robinson
Attorney, Agent, or Firm—Young & Thompson

[57] ABSTRACT

Apparatus for recording characters displayed on the screen of a cathode ray tube on an elongate record member has a stepper motor for advancing the record member on completion of a line of the character, recording being carried out substantially continuously by positional adjustments of the characters on the screen. Performance of the apparatus in response to record member advance instructions is monitored by a first transducer, which may be a digitizer, connected either to the stepper motor output shaft or to a spool from which the record member is unwound and by a second transducer, which may be driven by the record member or which may also be connected to the spool. The transducer signals are used to influence the position of the displayed characters on the cathode ray tube screen.

4 Claims, 2 Drawing Figures

RECORD MEMBER ADVANCE SYSTEM

The invention relates to a record member advance system for use in particular in an apparatus in which characters, normally alpha-numeric characters, are formed on a cathode ray tube for recordal on the record member.

In such apparatus, the record member advance system can be arranged to advance the record member, after each line of the characters has been recorded thereon, to a position for receiving the next line of characters, the formation of characters on the cathode ray tube screen being halted during such record member advance. To obviate the consequent delay, the movement of the record member may be co-ordinated with a displacement of the characters on the screen so that recording of the characters can continue in a substantially uninterrupted manner. In apparatus functioning in this way, the position of the record member needs to be very precisely co-ordinated with the location of the characters on the screen and it is accordingly an object of the present invention to provide a record member advance system which provides a superior precision of operation.

It is a further object of the invention to provide, in an apparatus for recording on a record member characters formed on a cathode ray tube screen, a feed system for the record member including means responsive to the speed of movement of the record member to provide a signal influencing the position of the characters on the cathode ray tube screen.

It is furthermore an object of this invention to provide in apparatus for recording on an elongate record member characters displayed on a screen of a cathode ray tube, means for advancing the record member in steps, means responsive to the actual position of the record member to provide a first correction signal for adjustment of the positions of the characters on the screen, and means responsive to the speed of advance of the record member to provide a second correction signal for adjustment of the character position.

The invention thus provides record member advance systems and character recording apparatus containing it in which errors due to record member positioning are eliminated or substantially eliminated.

Other objects, features and advantages of the present invention will appear from the following description of preferred embodiments thereof, given by way of illustrative example, in which reference is made to the accompanying drawings.

Figure 2:
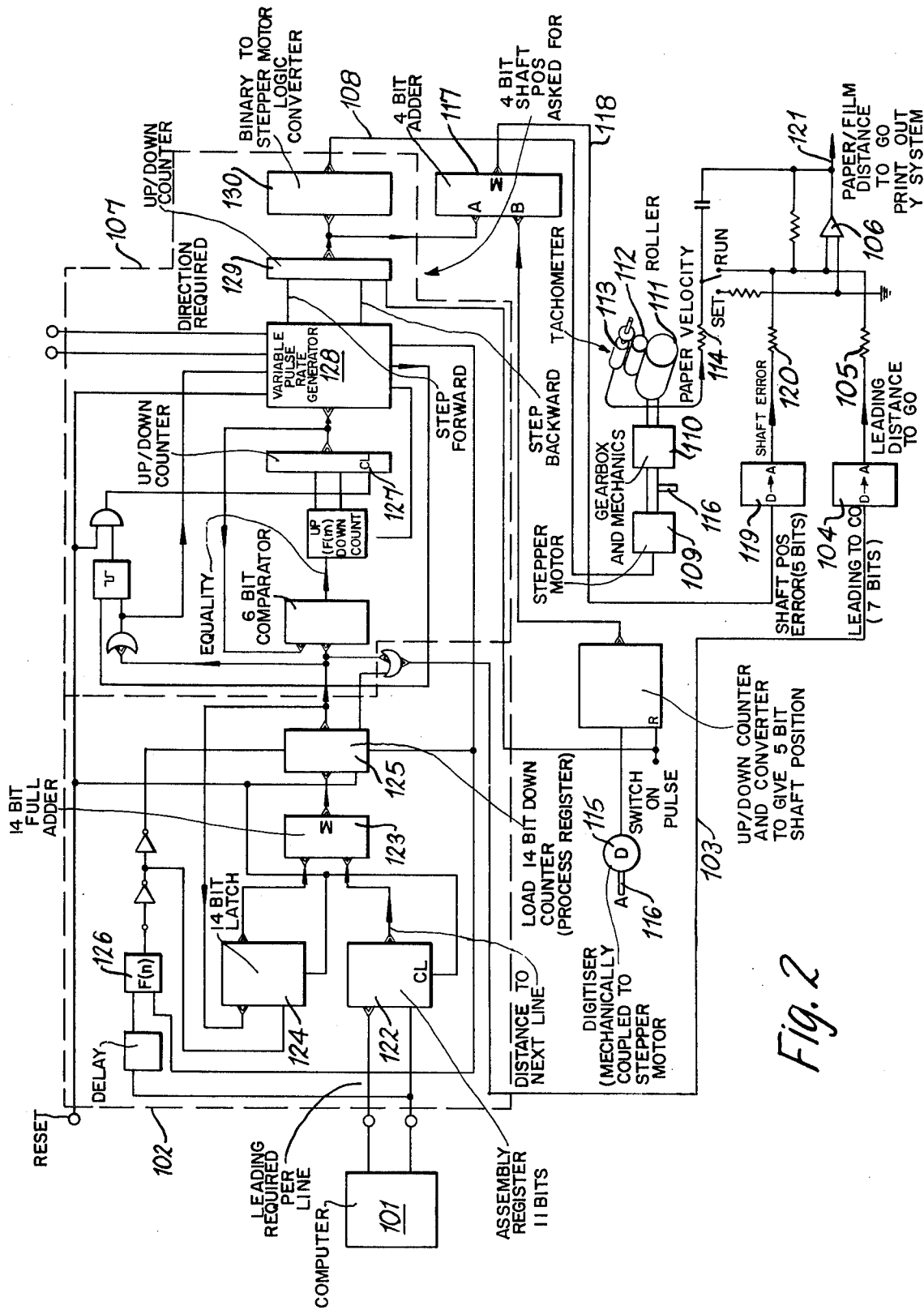

In the drawings:

FIG. 1 schematically shows an apparatus for recording characters including a first record member advance system in accordance with the invention; and FIG. 2 shows a second such apparatus including a modified form of record member advance system in accordance with the invention, again in schematic form.

Referring now to the drawings and firstly to FIG. 1 thereof, there is shown an elongate strip 1 of record material in the form of light sensitive film or paper, on which information in the form of a series of alpha-numeric characters is to be recorded. The information to be recorded is provided at one output terminal 2 of computer 3 having been taken from a store associated therewith. The output from the terminal 2 is fed via a data link 4 to a cathode ray tube 5 so as to be displayed on the screen 6 thereof.

One end of the film 1 is attached to a drive spool 7, so that the film can be drawn off from a feed spool 8. The film is thereby stretched in tension to have a planar portion 9 between the spools. The character display on the screen 6 of the cathode ray tube 5 is focused by a lens 10 on to this portion 9 of the film 1, to be recorded thereon.

The spool 7 is driven in steps by a stepper motor 11, which receives its input from a further output terminal 12 of the computer 3 along a data link 13. The signal at the terminal 12 conveys the required position of the stepper motor, and thus of the film 1, in order that the next line of information to appear on the screen 6 may be recorded on the next line of the film 1. This signal is also fed to a first input 14 of a comparator unit 15.

The computer 3 is also supplying information for the display of the next line of characters to the cathode ray tube 5. So that recording of this next line of characters can continue while the film 1 is being advanced to the next line position, the characters on the screen 6 are arranged to be displaced so as to be projected onto the film at the next position, the amount of displacement being gradually reduced as the film advances to the required position.

In order to obtain a measure of the actual film position as compared with the required position, the angular position, i.e. the number of revolutions from a datum position, of the spool 8 is detected by a digital transducer 16, and this information is supplied to a second input 17 of the comparator 15. Also connected to the feed spool 8 is a tachometer 18 that provides velocity information supplementary to that produced by the transducer 16. The output from the tachometer 18 is also applied through an analogue-to-digital converter to the input 17 of the comparator 15. In this way, the comparator 15 receives two main input signals, the first being from the computer 3 that provides the required position of the film 1, and the second being from the feed spool 8, which provides the actual position of the film 1. These signals are compared in the comparator 15 and an output signal representative of the difference is supplied to an amplifier 19 along a data link 20. The signal thus amplified is fed via data link 21 to the vertical deflection plates of the cathode ray tube 5, so as to vary the vertical positioning of the information displayed on the screen 6 to ensure that this is projected on to the film 1 in the correct position having regard to the actual location of the film 1.

The apparatus illustrated in FIG. 2 again has an elongate film constituting a record member which is withdrawn from a supply spool. The film however is advanced by means of a drive roller 111 and passes over a take-up roller 112 at a position at which recording of the character information on the film takes place.

A computer 101 derives a signal that is to be used to control the voltage applied to the vertical deflection plates of a cathode ray tube so as to position on the screen thereof the display of characters to be recorded on the light sensitive film. This signal is fed into a summation unit 102, and the digital signal obtained therefrom is fed over a data link 103 to a digital-to-analogue converter 104. The analogue signal thus obtained is fed via a resistor 105 to an input of an amplifier 106.

The same information from the summation unit 102 is passed into a speed control unit 107 that provides an output along a data link 108 for controlling the operation of a stepper motor 109. The output shaft of the motor 109 is connected to a gear box 110 and thence to the drive roller 111, by which the light sensitive film is advanced. The rotational speed of the take-up roller 112 is measured by a tachometer 113, the output of which is fed via a resistor 114 to the input of the amplifier 106.

A digitizer 115 is mechanically coupled by a shaft 116 to the output shaft of the stepper motor 109. The signal from the digitizer 115, being representative of the position of the output shaft, is applied to one input of a 4-bit adder 117. The other input to the adder 117 is provided by the signal applied to the input of the stepper motor 109, being representative of the required position of the stepper motor output shaft. The signal obtained in the adder 117 is thus representative of the error introduced by the motor, i.e. it is a measure of the extent to which the motor has failed to respond it its command signal. This signal is fed along a data link 118 via a digital-to-analogue converter 119 and a resistor 120 to the input of the amplifier 106.

The output signal from the amplifier 106 thus conveys to the vertical deflection plates of the cathode ray tube, along the data link 121, the amount of deflection required, accounting for error introduced by the mechanics of the stepper motor, and in dependence on the vertical position of the film, as defined by the output signal from the tachometer 113.

By mounting the tachometer close to the print position, the velocity signal of the speed of the paper obtained is used to produce a fast response in the position of the display on the cathode ray tube so that short term deviations of the paper from the positions expected from the digital signals can be followed. In this way, errors in mechanical linkage between the stepper motor output and the drive roller, and the quantising errors in the motor digital system are smoothed out.

Referring now in more detail to the summation unit 102, the output from the computer 101, which gives the vertical displacement of the next information character from the preceding information character of the display, is fed to an assembly register 122 and thence to a 14-bit full adder 123 whose operation is controlled by a latching circuit 124. The adder 123 supplies a signal to a counter or process register 125, and the output from the process register 125, under the control of a flip-flop circuit 126, is then conducted to the data link 103.

The output from the process register 125 also provides the information for the extent to which the stepper motor 109 has to be advanced, and this is fed to the unit 107 that provides an output signal indicative not only of the total movement required from the stepper motor, but also of the speed at which the stepper motor is to operate. This latter feature is obtained by feeding the signal into a counter 127 and thence to a variable pulse rate generator 128, through a further counter 129, which provides the digital output which is fed, as already described, to the adder 117, and also to a binary-to-stepper motor logic converter 130. The output from the converter 130 is applied to the data line 108 for control of the motor 109. By this means, it is ensured that the motor starts off slowly, accelerates smoothly and quickly to a maximum speed, and subsequently decelerates smoothly and quickly until it stops when the required advance of the film has been achieved. The circuitry also allows the speed of the motor to be varied while it is in operation.

It will be appreciated that the first line of information is recorded on the light sensitive film by projecting the first line of characters from the cathode ray tube on to the film with the film stationary. A "film advance" instruction is then given to the film advance system along the data links 103 and 121. If the advance of the film is complete, the next character line is written normally on the cathode ray tube screen. If not, then in accordance with the signal applied to the amplifier 106 from the data link 103, modified by the signal applied to the amplifier by the tachometer 113 representative of the instantaneous speed of the film, the output signal on the data link 121 provides the amount of vertical displacement of the display on the CRT screen required to compensate for the difference between the film advance required and the actual film advance achieved at that time. In other words, the vertical deflection signal applied along data link 121 to the cathode ray tube varies in time in accordance with the instantaneous position of the film, so that initially there is a larger deflection, and this decreases progressively, until the film has advanced completely to its new position. In practice, this results in the characters of the display on the CRT screen being written in a curved line.

By providing the film speed indicator, i.e. tachometer 113, at the printing position, immediate detection is obtained of any variation in the position of the film due, for example, to stretching or slackening occurring because of tension variations, and correction can be applied to the vertical deflection of the display. High speed operation of the film advance can thus be obtained while maintaining high positional accuracy.

Suitable choice of values for the resistors 105, 114 and 120 enables accurate operation of the web advance system at all velocities and accelerations.

It will be appreciated that a light sensitive film is only an example of the record member that could be used with the inventive system. It is envisages, for example, that a xerographic process could be employed for recording.

The illustrated arrangement of the rollers for advancing the film can of course be modified; any suitable arrangement in which a tachometer, or similar means, is provided at or near the printing position, could be used in accordance with the present invention.

It will be obvious to those skilled in the art that the embodiments of the invention described in detail can be variously modified without departing from the spirit of the invention.

What I claim is:

1. Character recording system comprising: drive means;
    a first spool arranged to be driven by the drive means;
        a second spool; a record member comprising a web of material on said second spool and having one end fixed to the first spool, said record member being adapted to record characters thereon;
    means arranged to pass a comman signal to the drive means for advancing the web a predetermined amount;
    first transducer means connected to said second spool and arranged to provide an output representative of the angular position of said second spool;
    second transducer means connected to said second spool and arranged to provide an output representative of the velocity of said second spool;
    comparator means;
    means arranged to apply said output of said first and second transducer means to said comparator means, said comparator means being arranged to compare said command signal with the output of said first and second transducer means and arranged to provide an output representative of difference therebetween;

means arranged to provide a display of the characters to be transferred to said web;

deflection means arranged to vary the position of said display; and means arranged to apply said difference output as a control signal to said deflection means whereby the position of said display of characters is varied in dependence on the instantaneous position of said record member.

2. A system as claimed in claim 1, wherein said means arranged to provide a display includes a cathode ray tube, and said deflection means is arranged to vary the position of said display on the screen of said cathode ray tube.

3. A system as claimed in claim 1, wherein said first transducer means comprises a digital transducer, and the second transducer means comprises an analogue transducer.

4. A system as claimed in claim 1, wherein said first transducer means comprises a digitiser and said second transducer comprises a tachometer.

* * * * *